United States Patent

Wellman

[15] 3,637,963

[45] Jan. 25, 1972

[54] BRAKE WARNING SWITCH WITH BYPASS

[72] Inventor: Ellis M. Wellman, Erie, Pa.
[73] Assignee: The Weatherhead Company, Cleveland, Ohio
[22] Filed: Mar. 2, 1970
[21] Appl. No.: 15,457

[52] U.S. Cl............................200/82 D, 188/152, 303/6 C
[51] Int. Cl...................................H01h 35/38, B60t 13/12
[58] Field of Search....................200/82 D; 303/6 C, 84 A; 188/152; 60/54.5 E

[56] References Cited

UNITED STATES PATENTS

| 3,441,318 | 4/1969 | Bueler | 200/82 D |
| 3,556,607 | 1/1971 | Shutt et al. | 303/6 C |
| 3,448,230 | 6/1969 | Bueler | 200/82 D |
| 3,464,741 | 9/1969 | Falk | 303/6 C |
| 3,472,559 | 10/1969 | Bueler | 303/6 C |
| 3,498,681 | 3/1970 | Bueler | 303/6 C |
| 3,532,390 | 10/1970 | Bueler | 200/82 D |

Primary Examiner—Robert K. Schaefer
Assistant Examiner—Robert A. Vanderhye
Attorney—McNenny, Farrington, Pearne and Gordon

[57] ABSTRACT

A fluid pressure switch is disclosed which includes a switch housing, an axial bore in the switch housing, and a switch piston slidably disposed in the axial bore and arranged to actuate a switch mechanism and complete an electrical circuit in response to a predetermined pressure differential between the fluid pressures acting on the opposed end faces of the piston. A modulating piston is also disposed in the axial bore for modulating the pressure of fluid flowing from an inlet passage to an outlet passage. Movement of the switch piston to complete the electrical circuit renders the modulating means inoperable so that the fluid pressure in the fluid inlet passage substantially equals the fluid pressure in the fluid outlet passage.

8 Claims, 1 Drawing Figure

PATENTED JAN 25 1972
3,637,963
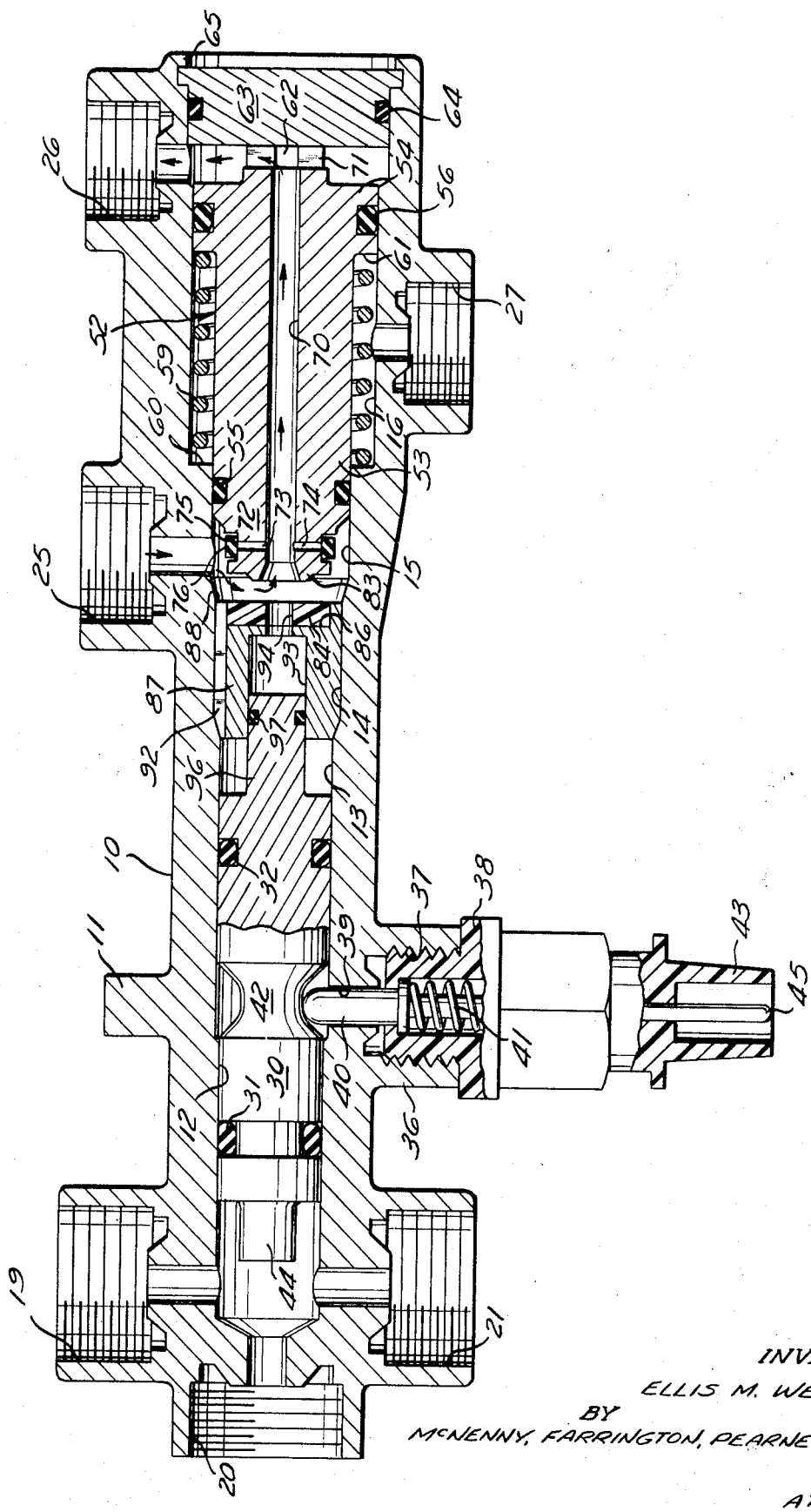
INVENTOR
ELLIS M. WELLMAN
BY
McNENNY, FARRINGTON, PEARNE & GORDON
ATTORNEYS

BRAKE WARNING SWITCH WITH BYPASS

BACKGROUND OF THE INVENTION

This invention relates generally to fluid pressure switches that are operable to complete an electrical circuit in the event of a predetermined pressure differential in a fluid pressure system, and more specifically to such switches that include fluid pressure modulating means. Still more specifically, the invention relates to such fluid pressure switches that are particularly adapted for use in motor vehicle hydraulic brake systems.

Hydraulic brake systems for motor vehicles, and particularly hydraulic brake systems for automobiles and small trucks, generally include a first fluid pressure circuit for the front wheel brakes and a second fluid pressure circuit hydraulically isolated from the first circuit for the rear wheel brakes. In this manner, a fluid pressure failure in one of the circuits does not render the entire brake system inoperable, since the other circuit will still operate to supply fluid pressure to its associated wheel brakes. To alert the vehicle operator of a failure in one of the two circuits of such a split or dual brake system, a warning switch is also generally provided which is operable to complete an electrical circuit to actuate an audio or visual warning device in the event of a predetermined pressure differential between the two circuits which would indicate a fluid pressure failure in one of the circuits. Such motor vehicle hydraulic brake systems may be further provided with a proportioning valve to provide a lower fluid pressure to the rear wheel brakes than to the front wheel brakes under severe braking conditions. This prevents premature lockup of the rear wheel brakes of the automobile, which might otherwise be caused by a weight decrease on the rear wheels resulting from a weight transfer from the rear wheel to the front wheels upon rapid deceleration.

Although certain prior art fluid pressure switches have received wide commercial acceptance, they nevertheless are subject to certain disadvantages. One such disadvantage is that the use of a warning switch and a proportioning valve requires the addition of two separate items to the brake system. This results in an increased parts cost and an increased labor cost for installing the two separate items in the brake system and, additionally, requires an increased service parts inventory. Another disadvantage of such systems is that the proportioning valve lowers the fluid pressure supplied to the rear wheel brakes under severe braking conditions, even if it is desired to provide full brake pressure to the rear brakes due to a failure in the front circuit.

SUMMARY OF THE INVENTION

The present invention overcomes these and other problems and disadvantages of prior art fluid pressure warning switches by providing a simple and inexpensive fluid pressure switch which includes a differential pressure operated switch and a proportioning valve in a single housing. The switch includes a piston movable in a bore from a central position to opposed translated positions in the event of a fluid pressure unbalance in a fluid pressure system, and movement of the switch piston in one direction renders the proportioning valve inoperable.

The preferred embodiment of the invention provides such a fluid pressure switch which may be utilized in a motor vehicle dual hydraulic brake system. The switch of the preferred embodiment includes a housing and a switch piston movable in the housing in response to a predetermined pressure differential between the front and rear circuits of the dual system for actuating a warning device to indicate a fluid pressure failure in one of the circuits. The switch housing is provided with three passages or fluid pressure chambers, and a proportioning or modulating means is provided in the switch housing for modulating the pressure of fluid flowing from the first passage to the second passage. The switch piston is constructed and arranged such that movement of the switch piston to one of its opposed translated positions in the event of a fluid pressure failure in the front circuit of the dual system renders the modulating means inoperable to modulate fluid pressure so that the fluid pressure in the first passage substantially equals the fluid pressure in the second passage.

The preferred embodiment of the invention further provides such a fluid pressure switch in which the housing includes a bore, and the switch piston and the modulating means are each disposed in the bore. Each of the three passages in a fluid communicating relationship with the bore, and the switch piston isolates the third passage from the first and second passages. The modulating means includes a modulating piston disposed in the bore which includes a first effective cross-sectional area exposed to the fluid pressure of the first passage and a second effective cross-sectional area greater than the first effective area exposed to the fluid pressure of the second passage. The modulating piston is operable to isolate the first passage from the second passage when a predetermined pressure obtains in the first passage. When the switch piston is moved to one of its opposed translated positions by a fluid pressure differential resulting from a failure in the front circuit of the dual system, the movement of the switch piston establishes direct fluid pressure communication between the first passage and the second passage so that the pressure supplied to the rear wheel brakes is not decreased by the modulating means when there is a fluid pressure failure in the front circuit.

The preferred embodiment of the invention further provides such a fluid pressure switch in which the modulating means is rendered inoperable by the switch piston opening a bypass passage means to bypass the modulating means in the event of a fluid pressure failure in the front system. The switch piston includes a portion making sealing engagement with the bypass passage means, and the movement of the piston in response to the predetermined pressure differential moves the portion out of sealing engagement to open the bypass passage means and establish direct fluid pressure communication between the first passage and the second passage. The portion is a reduced diameter end portion of the switch piston and the reduced diameter end portion is slidably received in the bypass passage means.

The preferred embodiment of the invention further provides such a fluid pressure switch in which the modulating means includes a modulating piston slidably mounted in the bore with the switch piston for movement to and from a resilient plug member. The modulating piston includes an axial passage extending at least partially therethrough, and the end of the modulating piston around the axial passage defines an annular valve head adapted to cooperate with the resilient plug member to control fluid flow between the first passage and the second passage. A spring means is provided to bias the modulating piston away from the resilient plug member. A bypass passage means is provided, and movement of the switch piston in response to the predetermined fluid pressure differential opens the bypass passage to bypass the cooperating annular valve head and plug member and to establish direct fluid communication between the first passage and the second passage. To minimize machining of the switch housing, an insert member is anchored in the bore for carrying the valve seat member, and the bypass passage includes an aperture extending through the insert member and the valve seat member.

DESCRIPTION OF THE DRAWING

The drawing is a cross-sectional side elevational view of a fluid pressure switch according to the preferred embodiment of this invention.

DESCRIPTION OF THE PREFERRED EMBODIMENT

Referring now to the drawing in greater detail, a fluid pressure warning switch is shown which may be used in any desired system, but which is described in detail herein with particular reference to a dual hydraulic brake system for purposes of example so that the structure and operation of the switch may be most clearly understood. The fluid pressure switch includes a switch housing 10, which is preferably of extruded brass but which alternatively may be of any other desired material. The switch housing 10 includes a projecting mounting stud 11, which may be used to mount the switch on the motor vehicle. An axial bore extends from end to end through the switch housing and includes a bore 12, a first counterbore 13, a second counterbore 14, a third counterbore 15, and a fourth counterbore 16. Each successive counterbore proceeding from the left to the right is of larger diameter than the previous counterbore. The switch housing 10 is further provided with an inlet port 19 which may be suitably connected to receive fluid from the one pressure chamber of a dual master cylinder (not shown) of a dual hydraulic brake system, and a pair of outlet ports 20 and 21 which may be suitably connected to distribute the brake fluid from the one master cylinder pressure chamber to two front wheel brakes (not shown) of the motor vehicle. An inlet port 25 is also provided which may be suitably connected to receive hydraulic brake fluid from the other pressure chamber of the dual master cylinder (not shown) and an outlet port 26 which may be suitably connected to distribute hydraulic brake fluid from the other master cylinder chamber to two rear wheel brakes (not shown). A vent port 27 is provided for purposes that will be explained in detail hereinafter. Each of the described ports is threaded for receiving a suitable fitting, which is preferably of the inverted flare type.

Slidably disposed within the bore 12 and counterbore 13 is a warning switch actuating piston 30. The switch piston 30 is provided with a first elastomeric O-ring seal 31 adjacent the ports 19, 20, and 21 for hydraulically isolating the fluid of the front circuit from the fluid of the rear circuit and for preventing loss of fluid from the front circuit through the warning switch as will be described hereinafter. In a similar manner, a second elastomeric O-ring seal 32 also prevents fluid pressure communication between the rear circuit and the front circuit, and prevents loss of fluid from the rear circuit through the warning switch.

The housing 10 is further provided with a projecting boss 36 having at its outer end a threaded opening 37 into which is screwed a switch mechanism housing or body 38 preferably made of an insulating material such as nylon or the like. A transverse bore 39 extends from the threaded opening 37 to the counterbore 13. The switch mechanism body 38 has a sliding plunger 40 which extends through the transverse bore 39 and is spring biased by a spring 41 into engagement with a reduced diameter portion 42 of the switch piston 30. The plunger 40 is loosely fit in the bore 39 to allow outward leakage of fluid escaping past the O-ring seals 31 and 32 to prevent hydraulic lockup. Such fluid can then escape either by separate vent or through the switch mechanism body 38. The biasing force of the spring 41 on the plunger 40 maintains the switch piston 30 in its normally centered position as shown in the drawing. Although not shown in the drawing, the switch mechanism contained within the body 38 is constructed and arranged so that the plunger 40 is electrically insulated from a contact element 45 maintained within an insulating sleeve 43 of the switch mechanism body 38 when the plunger 40 engages the reduced diameter portion 42 of the piston 30. However, when the switch piston 30 is moved from its shown centered position to a displaced or translated position by a fluid pressure differential between the front circuit and the rear circuit acting on the opposed end faces of the piston 30, the plunger 40 will be moved radially outwardly and electrically contact the contact element 45 contained within the sleeve portion 43. The contact element 45 may be electrically connected to the ground side of an audio or visual warning device in a well-known manner, so that the warning device will be electrically actuated when this occurs. An axial projection 44 of the switch piston 30 is provided to limit the travel of the switch piston 30 in the leftward direction as shown in the drawing. It will be understood that the structural details of the switch mechanism and switch mechanism body 38 have not be shown in detail because they are well-known in the prior art and because any suitable switch mechanism which may be actuated by axial displacement of switch-actuating piston may be used.

Interposed between the rear inlet port 25 and the rear outlet port 26, and disposed within the axial bore extending through the switch housing 10, is a proportioning or modulating means for controlling the fluid pressure supplied to the rear brakes. The structural details and mode of operation of this modulating means are more fully disclosed and described in U.S. Pat. application Ser. No. 813,820, filed Apr. 7, 1969.

The modulating valve includes a proportioning or modulating piston 52 having a smaller diameter portion 53 adjacent the inlet port 25 exposed to inlet pressure and a larger diameter portion 54 adjacent the outlet port 26 exposed to outlet pressure. The portions 53 and 54 make sealing contact with the counterbores 15 and 16, respectively, by the annular seal rings 55 and 56. A coil spring 59 acts between the shoulder 60 formed at the junction of counterbores 15 and 16, and the shoulder 61 formed at the junction of the smaller diameter portion 53 and the larger diameter portion 54 to bias the piston 52 to the right as shown in the drawing so that a projecting stop 62 of the piston engages a plug member 63 to maintain the piston in a spring-biased position. The plug 63 is provided with an annular seal 64 to prevent the escape of fluid, and the plug 63 is secured in place by spinning or deforming the angular tab or flange 65 radially inwardly to the position shown in the drawing. An axial passage 70 extends through the piston 52 to connect with transverse passages 71 in stop 62 and establish fluid pressure communication between the rear inlet port 25 and the rear outlet port 26 when the piston is in the spring-biased position shown in the drawing.

The vent port 27 communicates with the portion of the counterbore 16 between the shoulders 60 and 61 to insure that the differential piston area between the portions 53 and 54 is always exposed to atmospheric pressure. This prevents hydraulic lockup of the piston 52 in its spring-biased position, such as might otherwise occur in the absence of such a passage should there by a leak past either of the seals 55 or 56. The vent port 27 my be hydraulically connected to the fluid reservoir of the dual master cylinder, or may be provided with a filter means such as oiled felt to permit atmospheric pressure to be maintained on the differential area of the piston while preventing contaminates from entering the unit.

At the inlet side of the proportioning valve, the proportioning piston 52 is provided with a reduced diameter end portion 72. The end portion 72 is provided with several passages 73 and 74 which extend radially outwardly from the passage 70 to the external surface of the piston 52. As shown in the preferred embodiment, the passages 73 and 74 terminate at an annular groove 75 which receives an annular elastomeric band or belt 76 to form a one-way ring or garter-type check valve as will be discussed in greater detail hereinafter.

The left end of the proportioning piston 52 forms an annular rounded valve head 83 which cooperates with a valve seat 84 to restrict or block fluid flow between the inlet port 25 and the outlet port 26 when the piston is moved to a displaced position leftward of the spring biased position shown in the drawing. The valve seat member 84 is preferably formed of a hard and wear resistant material such as nylon and is pressed into an annular groove 86 of a carrier member 87. The carrier member 87 is suitably staked in the axial bore as at 88 to prevent any axial movement of the carrier member or the valve seat member 84.

Under low-pressure conditions, such as occur in the brake system under very moderate braking conditions or while the brake shoes and/or pads are advancing toward their associated brake surfaces, the resulting force acting on the proportioning piston 52 due to the difference in effective cross-sectional areas of the portions 53 and 54 is not sufficient to overcome the biasing force of the spring 59 so that the piston assumes the position shown in the drawing. In this position the proportioning valve does not decrease the fluid pressure, so that the outlet pressure supplied to the rear brakes of the automobile from the port 26 is substantially equal to the pressure supplied to the inlet port 25 from the master cylinder. The fluid flow through the valve will then be as shown by the arrows in the drawing.

Under more severe braking conditions, the fluid pressure in the rear circuit increases above a predetermined or trigger pressure. When this occurs, the resulting axial force on the proportioning piston 52 due to the difference in effective cross-sectional areas of the portions 53 and 54 will move the piston 52 to the left against the biasing force of the spring 59. In the preferred embodiment, the spring 59 has a relatively high preload and a relatively low spring rate so that this movement will occur with little pressure increase when this predetermined pressure has been reached. Since the brake shoes and/or pads have already contacted their braking surfaces when this occurs, there will be very little or no flow from the inlet port 25 through the proportioning valve to the outlet port 26 as the pressures continue to increase.

With the piston 52 is this displaced position, the valve head 83 engages the valve seat member 84 to isolate the inlet pressure acting on the smaller diameter portion 53 from the outlet pressure acting on the larger diameter portion 54. Then, as the inlet pressure from the rear master cylinder pressure chamber increases beyond the predetermined trigger pressure, the difference in effective cross-sectional areas between the portions 53 and 54 will result in a pressure increase in the outlet side of the valve that is less than but proportional to the pressure increase on the inlet side. The proportional relationship between the increase in inlet pressure and the increase in outlet pressure above the trigger pressure is equal to the proportional relationship between the areas of the smaller diameter portion 53 and the larger diameter portion 54. Should any makeup fluid be required downstream of the proportioning valve, for example, due to radial expansion of the hydraulic lines, deformation of seals, deformation of shoes and drums, or leakage, the piston 52 will move to the right only enough to permit this makeup fluid to flow between the valve head 83 and the valve seat member 84. If this occurs, the pressure drop takes place across the members 83 and 84 so that the restricted space between them serves as a valve throttling area.

When the brakes are released so that the fluid pressure from the rear master cylinder pressure chamber decreases from a pressure which is greater than the trigger pressure, the fluid pressure in the outlet chamber 26 supplied to the rear wheel brakes will remain constant until the inlet pressure has decreased to a point at which it is less than the outlet pressure in the port 26. This is because the outlet pressure retains the piston 52 in its displaced position so that isolation between the outlet and inlet ports is maintained. When the inlet pressure has decreased so that it is less than the outlet pressure, the ring-type check valve formed by the passages 73 and 74 and the annular band 76 opens to permit pressure equalization between the rear inlet pressure and the rear outlet pressure as the rear circuit pressure decreases to the trigger pressure. Further decrease in the rear system pressure below the trigger pressure then permits the piston 52 to return to the spring-biased position shown in the drawing.

By providing the fluid pressure switch of the preferred embodiment with a proportioning valve in the switch housing, manufacturing and installation costs are lowered, and the possibility of fluid leakage in external lines connecting prior art proportioning valves to prior art fluid pressure switches is eliminated. Furthermore, by locating the proportioning valve in the same bore as the switch piston is located, the device is further simplified and a single port may be utilized to supply fluid from the rear master cylinder pressure chamber to a central portion of the axial bore so that the fluid pressure will act on both the warning switch actuating piston and on the proportioning valve piston.

The preferred embodiment of the invention further provides such a fluid pressure switch with a means for rendering the proportioning valve inoperable in the event of a fluid pressure unbalance. When the switch is used in a dual hydraulic brake system, such a pressure unbalance would indicate a failure in the front circuit of the brake system. This would preclude proportioning of the fluid pressure from the rear master cylinder chamber to the rear wheel brakes if there were a failure in the front circuit so that the maximum available fluid pressure would be supplied to the rear wheel brakes under such emergency conditions. As shown in the drawing, the valve seat carrier member 87 is provided with one or more axially extending passages 92 along its outer periphery. The carrier member 87 further includes an axial passage 93 extending from end to end therethrough in alignment with an axial passage 94 which extends through the center of the valve seat member 84. A reduced diameter projecting end portion 96 of the switch piston 30 extends into the passage 93, and an annular elastomeric O-ring seal 97 seals against the wall of the passage 93 to prevent fluid flow therethrough when the switch piston 30 is in its centered position shown in the drawing.

In the event of a fluid pressure unbalance such as would indicate a fluid pressure failure in the front circuit of a dual brake system when the warning switch is used in such a dual system as described hereinbefore, the switch piston 30 will be displaced to the left by the pressure differential between the front circuit and the rear circuit. This causes the plunger 40 to be displaced radially outwardly so that the plunger 40 electrically connects the contact element within the sleeve 43 to ground the contact element through the housing 10 and actuate an audio or visual warning device. This leftward movement of the piston 30 also moves the end portion 96 and seal 97 out of the axial passage 93 to permit fluid flow therethrough. When this occurs, and a sufficient force is applied to the brake pedal to cause the fluid pressure from the rear master cylinder chamber to exceed the proportioning valve trigger pressure, the proportioning piston 52 will be displaced to the left as described above so that the valve head 83 and the valve seat member 84 engage one another. However, because the portion 96 and seal 97 are disengaged from the passage 93 due to movement of the switch piston 30, fluid is free to flow from the inlet port 25, through the outer passages 92, through the passages 93, 94 and 70, and to the outlet port 26. This establishes direct fluid communication between the rear inlet port 25 and the rear outlet port 26 so that the proportioning valve is rendered inoperable and the full fluid pressure from the rear master cylinder chamber is supplied to the rear wheel brakes even under severe braking conditions when there has been a failure in the front circuit.

Although a preferred embodiment of the invention has been shown and described in detail, various modifications and rearrangements may be made upon a full understanding of this invention and may be resorted to without departing from the scope of the invention as defined by the claims.

What is claimed is:

1. A fluid pressure switch comprising a switch housing, a bore in said switch housing, a switch member axially movable in either direction in said bore responsive to a predetermined pressure differential to make an electrical circuit, a first fluid passage in said switch housing, a second fluid passage in said switch housing, a third fluid passage in said switch housing, each of said fluid passages being in fluid communicating relationship with said bore, said switch member including a switch piston slidable disposed in said bore isolating said third fluid passage from said first and second fluid passages, valve means in said switch housing for modulating the pressure of fluid flowing from said first fluid passage to said second fluid passage; said valve means including a valve seat member disposed in said bore, a modulating piston slidably mounted in said bore in axially aligned relationship to said switch piston for movement to and from said valve seat member, said modulating piston including an axial passage extending axially at least partially through said modulating piston, the end of said modulating piston around said axial passage defining an annular valve head adapted to cooperate with said valve seat member to control fluid flow and modulate pressure between said first fluid passage and said second fluid passage, spring means operable to bias said modulating piston away from said valve seat member to a first position in said bore, and differential area means exposed to the fluid pressures in said first fluid passage and said second fluid passage and operable by differential forces to move said modulating piston from said first position against the force of said biasing means toward said switch piston so that said valve head moves into cooperating engagement with said valve seat member; means responsive to said movement of said switch member in one direction for maintaining a passage between said first fluid passage and said second fluid passage to thereby render said valve means inoperable to modulate said pressure so that the fluid pressure in said first passage substantially equals the fluid pressure in said second passage, and said modulating piston being unmoved from said first position by said movement of said switch piston in the other direction to make said electrical circuit.

2. A fluid pressure switch as defined in claim 1, including a bypass passage means in said switch housing and a sealing means for closing said bypass passage means, said movement of said switch piston responsive to said fluid pressure differential moving said sealing means to open said bypass passage means and establish fluid communication between said first fluid passage and said second fluid passage to bypass said cooperating annular valve head and valve seat member.

3. A fluid pressure switch as defined in claim 2 wherein said bypass passage means includes an aperture formed in said valve seat member.

4. A fluid pressure switch as defined in claim 2 including an insert member anchored in said bore intermediate said switch member and said modulating piston, said insert member carrying said valve seat member, said bypass passage means including a first aperture extending through said insert member and a second aperture extending through said valve seat member, and said sealing means including a reduced diameter end portion of said switch member slidably disposed in said first aperture.

5. A fluid pressure switch as defined in claim 4 wherein said insert member includes a third aperture means adjacent its outer periphery for providing fluid communication between said first fluid passage and said bypass passage means when said sealing means opens said bypass passage means.

6. A fluid pressure switch comprising a switch housing, a bore in said switch housing, a switch member movable in said switch housing responsive to a predetermined pressure differential to make an electrical circuit, a first fluid passage in said switch housing, a second fluid passage in said switch housing, a third fluid passage in said switch housing, each of said fluid passages being in fluid communicating relationship with said bore, said switch member including a switch piston slidably disposed in said bore isolating said third fluid passage from said first and second fluid passages, valve means in said switch housing for modulating the pressure of fluid flowing from said first fluid passage to said second fluid passage; said valve means including a valve seat member disposed in said bore, a modulating piston slidably mounted in said bore in axially aligned relationship to said switch piston for movement to and from said valve seat member, said modulating piston including an axial passage extending axially at least partially through said modulating piston, the end of said modulating piston around said axial passage defining an annular valve head adapted to cooperate with said valve seat member to control fluid flow between said first fluid passage and said second fluid passage, spring means operable to bias said modulating piston away from said valve seat member, and differential area means exposed to the fluid pressures in said first fluid passage and said second fluid passage and operable by differential forces to move said modulating piston against the force of said biasing means so that said valve head moves into cooperating engagement with said valve seat member, said movement of said switch member to make said electrical circuit rendering said valve means inoperable to modulate said pressure so that the fluid pressure in said first passage substantially equals the fluid pressure in said second passage, bypass passage means in said switch housing and sealing means for closing said bypass passage means, said bypass passage means including an aperture formed in said valve seat member, said movement of said switch piston responsive to said fluid pressure differential moving said sealing means to open said bypass passage means and establish fluid communication between said first fluid passage and said second fluid passage to bypass said cooperating annular valve head and valve seat member.

7. A fluid pressure switch comprising a switch housing, a bore in said switch housing, a switch member movable in said switch housing responsive to a predetermined pressure differential to make an electrical circuit, a first fluid passage in said switch housing, a second fluid passage in said switch housing, a third fluid passage in said switch housing, each of said fluid passages being in fluid communicating relationship with said bore, said switch member including a switch piston slidably disposed in said bore isolating said third fluid passage from said first and second fluid passages, valve means in said switch housing for modulating the pressure of fluid flowing from said first fluid passage to said second fluid passage; said valve means including a valve seat member disposed in said bore, a modulating piston slidably mounted in said bore in axially aligned relationship to said switch piston for movement to and from said valve seat member, said modulating piston including an axial passage extending axially at least partially through said modulating piston, the end of said modulating piston around said axial passage defining an annular valve head adapted to cooperate with said valve seat member to control fluid flow between said first fluid passage and said second fluid passage, spring means operable to bias said modulating piston away from said valve seat member, and differential area means exposed to the fluid pressures in said first fluid passage and said second fluid passage and operable by differential forces to move said modulating piston against the force of said biasing means so that said valve head moves into cooperating engagement with said valve seat member, said movement of said switch member to make said electrical circuit rendering said valve means inoperable to modulate said pressure so that the fluid pressure in said first passage substantially equals the fluid pressure in said second passage, bypass passage means in said switch housing and sealing means for closing said bypass passage means, said movement of said switch piston responsive to said fluid pressure differential moving said sealing means to open said bypass passage means and establish fluid communication between said first fluid passage and said second fluid passage to bypass said cooperating annular valve head and valve seat member, an insert member anchored in said bore intermediate said switch member and said modulating piston, said insert member carrying said valve seat member, said bypass passage means including a first aperture extending through said insert member and a second aperture extending through said valve seat member, and said sealing means including a reduced diameter end portion of said switch member slidably disposed in said first aperture.

8. A fluid pressure switch as defined in claim 8 wherein said insert member includes a third aperture means adjacent its outer periphery for providing fluid communication between said first fluid passage and said bypass passage means when said sealing means opens said bypass passage means.

* * * * *

UNITED STATES PATENT OFFICE
CERTIFICATE OF CORRECTION

Patent No. 3,637,963     Dated January 25, 1972

Inventor(s) Ellis M. Wellman

It is certified that error appears in the above-identified patent and that said Letters Patent are hereby corrected as shown below:

Column 8, line 64, change "claim 8" to --claim 7--

Signed and sealed this 3rd day of October 1972.

(SEAL)
Attest:

EDWARD M. FLETCHER, JR.
Attesting Officer

ROBERT GOTTSCHALK
Commissioner of Patents